G. HABERLAND.
Combined Horse and Wagon Brake.
No. 72,484.  Patented Dec. 24, 1867.
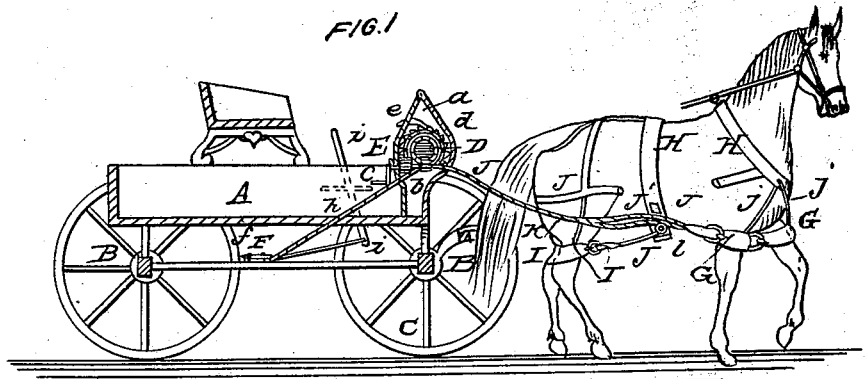
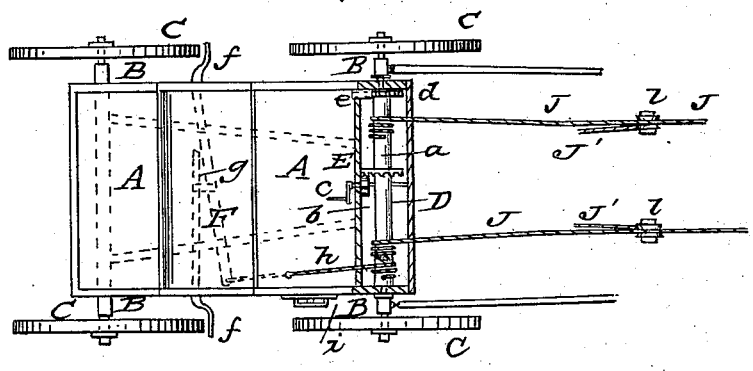
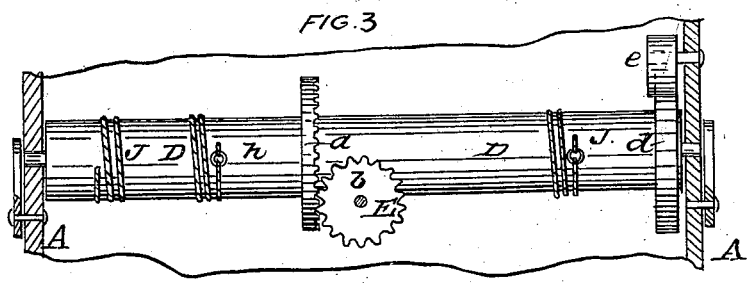

United States Patent Office.

G. HABERLAND, OF PONTIAC, ILLINOIS.

Letters Patent No. 72,484, dated December 24, 1867.

IMPROVEMENT IN A COMBINED HORSE AND WAGON-BRAKE.

*The Schedule referred to in these Letters Patent and making part of the same.*

TO ALL WHOM IT MAY CONCERN:

Be it known that I, G. HABERLAND, of Pontiac, in the county of Livingston, and State of Illinois, have invented a new and Combined Horse and Wagon-Brake; and I do hereby declare that the following is a full, clear, and exact description thereof, which will enable others skilled in the art to make and use the same, reference being had to the accompanying drawings, forming part of this specification.

Figure 1 represents a side elevation partly in section of my invention.

Figure 2 is a plan or top view of the same.

Figure 3 is a detail end view, on an enlarged scale, of the same.

Similar letters of reference indicate corresponding parts.

This invention relates to a new device for preventing horses from running away, and consists in arranging straps around the horse's legs, which are connected by suitable lines or cords with a drum fitted in the front part of the wagon. By revolving the drum, the lines will be wound around it, and the horse's feet will be drawn together, preventing the horse from running.

The invention also consists in combining with the aforesaid horse-brake a wagon-brake, which is also connected with the revolving drum, but which may also, if desired, be operated independant of the horse-brake by means of a suitable lever.

A represents a wagon-box, mounted upon axles B B, which are supported by wheels C C, in the ordinary manner. D is a horizontal drum, mounted in the front part of the wagon-box, and provided with a bevel or other gear-wheel, $a$, as shown in fig. 3. A short shaft, E, carrying a pinion, $b$, which meshes into the wheel $a$ is provided with a crank, $c$, by turning which, rotary motion is imparted to the drum. A ratchet-wheel, $d$, is mounted on the drum, and a pawl, $e$, falls into the same, whereby the drum is only permitted to revolve in one direction, unless the pawl is thrown off the ratchet-wheel. F F are two horizontal levers, pivoted to the framework of the wagon, under the box A, and carrying brake-shoes, $f$, at their outer ends. They are connected with each other by means of a short lever or bar, $g$, as shown by dotted lines in fig. 2, and one of them is also connected by means of a cord or strap with a vertical lever, $i$, pivoted to the side of the box A. By means of a cord or strap, $h$, one of the brake-arms F is also connected with the drum D, the said cord being secured to the drum, so that by revolving the latter, the cord will be wound upon it, and the brake will be applied to the hind wheels of the wagon. The brake can also be applied by means of the lever $i$, if desired, without using the drum. G G are straps, suspended by means of cords or straps, $jj$, from the harness H, so that they can be buckled around the front legs of the horse. I I are straps, suspended by means of cords or straps K K from the harness H, so that they can be buckled around the hind legs of the horse. J J are cords or lines, secured with their rear ends to the drum, while their front ends are fitted over pulleys, $l$, which are arranged on each side of the saddle-strap of the harness. The front end of each cord J is secured to one of the straps G, as shown. To each cord J is, between the pulleys $l$ and the drum D, secured another line or cord, J', which is also passed over the pulley $l$, and which is then turned back and secured to the leg-strap I, as shown.

It will be clearly understood, that, as the drum is revolved, so that the cords J J are wound upon it, the straps G and I on each side of the horse will be drawn together, and that thereby the horse's legs will be tied, preventing it from running. The pawl $e$ locks the drum, so that the horse cannot unwind the cords J again, and not until the pawl is thrown out of the ratchet can the cords be unwound and the horse's legs be again released.

As, by the revolution of the drum, the horse and wagon-brakes are applied jointly, the course of a vehicle can be instantly stopped, whenever desired. The device can also be applied for tying horses without the use of a post or standard.

I claim as new, and desire to secure by Letters Patent—

1. A horse-brake consisting of the front-leg straps G G, hind-leg straps I I, and cords or lines J and J', the latter fitted over pulleys $l$, and all combined with the drum D arranged in the front part of the wagon, substantially as herein shown and described.

2. The above, in combination with the wagon-brake $ff$, connected with the drum by means of a cord or line, $h$, and provided with a lever, $i$, substantially as herein shown and described.

G. HABERLAND.

Witnesses:
JOHN GEIGER,
MARTIN DOBLE.